M. E. GODDARD.
SEPARATION OR DRESSING OF SEEDS AND GRAIN AND APPARATUS FOR USE IN CONNECTION THEREWITH.
APPLICATION FILED JULY 6, 1918.
1,373,323.
Patented Mar. 29, 1921.
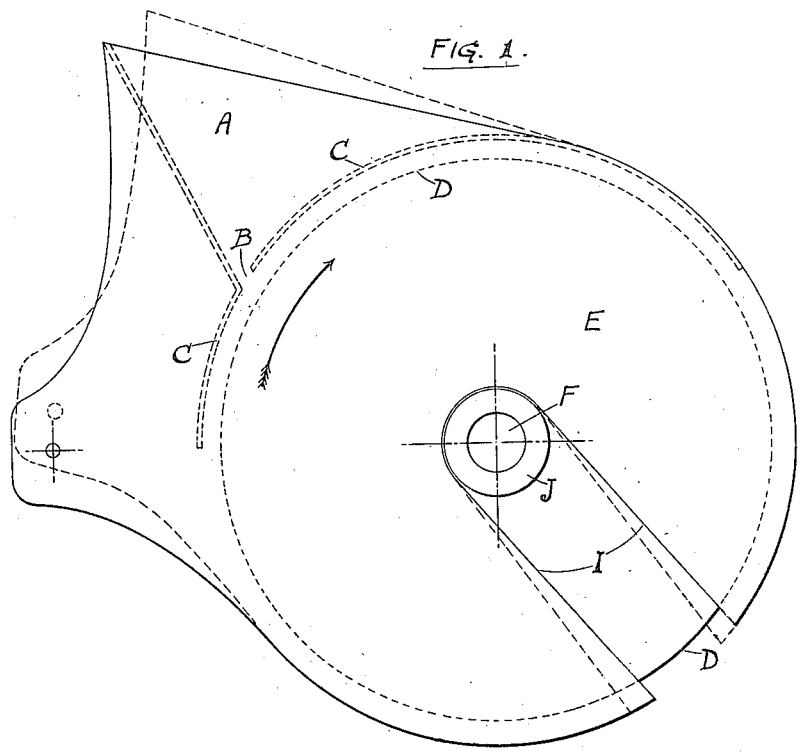
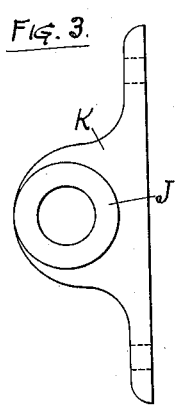
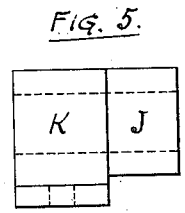
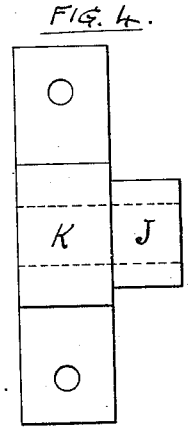
INVENTOR:
MAURICE EVELYN GODDARD.
Per John E. Walsh
ATTORNEY.

M. E. GODDARD.
SEPARATION OR DRESSING OF SEEDS AND GRAIN AND APPARATUS FOR USE IN CONNECTION THEREWITH.
APPLICATION FILED JULY 6, 1918.

1,373,323.

Patented Mar. 29, 1921.
2 SHEETS—SHEET 2.

INVENTOR
MAURICE EVELYN GODDARD.
Per John E. Walsh
ATTORNEY.

UNITED STATES PATENT OFFICE.

MAURICE EVELYN GODDARD, OF DONCASTER, ENGLAND.

SEPARATION OR DRESSING OF SEEDS AND GRAIN AND APPARATUS FOR USE IN CONNECTION THEREWITH.

1,373,323.  Specification of Letters Patent.  Patented Mar. 29, 1921.

Application filed July 6, 1918. Serial No. 243,603.

*To all whom it may concern:*

Be it known that I, MAURICE EVELYN GODDARD, a subject of the King of Great Britain and Ireland, residing at Doncaster, in the county of York, England, have invented new and useful Improvements in the Separation or Dressing of Seeds and Grain and Apparatus for Use in Connection Therewith, of which the following is a specification.

This invention relates to the roller separation of light and irregular-shaped seeds or grain from solid and even-shaped seeds or grain.

For purifying or separating flour and the like, it has been proposed to employ a roller or cylinder having a more or less linear feed and having the feed hopper adjustable (non-circumferentially) over the roller in a direction at right angles to the axis of the roller to give a more or less complete separation, the roller revolving in the same direction as the feed of material, and the separation being effected by adhesion of the purer portions of the flour to the surface of the roller until removed by a scraper; it has also been proposed to utilize this type of separating roller or cylinder in various ways in series. For separating dust and the like from coal, tobacco, and other materials or mixtures, it has also been proposed to employ a roller or drum (either plain or covered) revolving against the non-linear feed of material.

My present invention consists essentially in delivering the material to be cleaned on to the upwardly moving part of the cylindrical external upper surface of a roller revolving in a direction opposite to the feed of material, in such a manner that the material comes into linear contact with the oppositely moving roller surface so that a separation is effected at the point of contact, and which linear contact can be adjusted circumferentially and concentrically so as to fall on any desired part of the roller circumference (within an arc of about 60°) so as to give a lighter or a heavier dressing of the material and so as to maintain a uniform distance between the feed hopper and the roller surface.

My said invention is much superior to the ordinary blower and aspirator, as the separating process is carried out more economically and cleaner, with a saving of seed as compared with blowing or wind separation.

*Description of accompanying drawings.*

Figure 1 is an end elevation illustrating the principle of my improved roller separation with linear feed contact adjustable concentrically to various points in the periphery of the roller.

Fig. 3 is an end elevation, Fig. 4 a front elevation, and Fig. 5 a plan, all on a larger scale, of the bearing bracket shown in Fig. 2 for supporting the revolving separating roller and its adjustable and detachable cylindrical cover.

Figure 2:
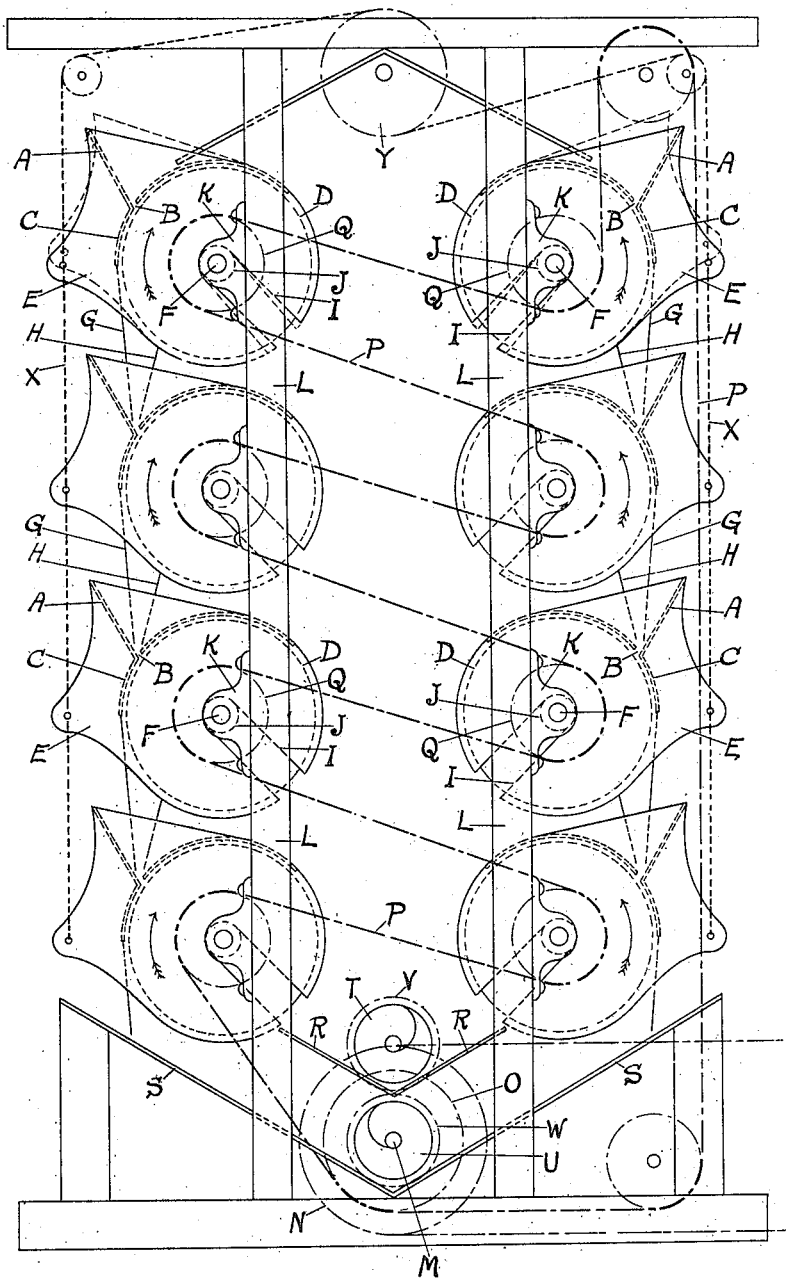
Fig. 2 is an end elevation of my invention arranged in the form of a double machine as hereinafter described.

According to my said invention the feed hopper A having slot B is combined integrally with a segmental cylindrical cover C which concentrically incases the upper surface of the revolving roller D and is adjusted circumferentially thereover by means of end plates E pivoted about the roller shaft F. This cylindrical outer cover C remains normally stationary, but by moving it in the direction of rotation of the roller D (as indicated by arrows in the drawings) the angle of incidence of the material is varied so that a heavier dressing is obtained, while a lighter dressing is obtained by moving in the opposite direction. The material is fed throughout at a uniform distance between the hopper and the roller surface, and separation is effected practically instantaneously at the point of contact.

Any desired number of the rollers D are arranged in an upright series (see Fig. 2), each roller delivering the good seed into the hopper A of the next roller beneath, and a curtain G and partition H being provided between each pair of rollers to insure such delivery into the next hopper. Each cylindrical outer cover C is readily detachable from its roller, the end plates E being for this purpose formed with slots I adapted to slide over inwardly-projecting axial bosses J on the respective brackets K which support the roller at each end on the frame L. The rollers D are preferably solid, that is to say; formed with a continuous face which may also be covered with sleeves of various textures of material to give the required frictional surface which may be found suitable to effect the separation of the stock being treated. Two of the aforesaid upright series of rollers D are preferably combined as shown in one machine, which delivers the extracted waste or inferior seed from both series of rollers toward the center of the machine, which is driven from a main shaft M (having belt pulley N and driving sprocket O) by means of an endless belt or chain P passed over and under pulleys or chain wheels Q at one end of the roller shafts F in such a manner as to drive the rollers D in correct direction toward the center of the machine. The waste seed delivered by the rollers D is received into a collecting trough R, and the good seed is similarly received into a lower trough S, the good seed and the waste seed being finally discharged at opposite ends of the machine, by means of oppositely-driven worm conveyers T and U working respectively within the said collecting troughs and geared together by gear wheels V and W driven from the main shaft M. The series of cylindrical outer covers C are connected together for simultaneous and uniform adjustment, for instance by cords X passing in opposite directions around a drum Y at the top of the machine, or by upright connecting rods controlled from the bottom by separate cams on each side of the machine.

When the machine is in operation, the stock being treated is delivered to the feed hoppers A at the top of the machine and the said hoppers are adjusted to the desired position, so that as the stock is discharged through the slot B it will make contact at the required angle with the roller D, and the good grain will be delivered between the curtain G and partition H to a lower hopper A to be again treated for further separation of the wild grain.

The lighter or wild grain and roughage is carried around by the roller D and delivered into the center of the machine where it descends and is collected in the trough R.

The good grain will be fed from the upper hopper A successively to the adjacent lower hoppers being treated in successive steps so that all the roughage and wild grain will be separated and ultimately discharged into the trough R while the good grain is delivered to the trough S.

The wild grain is discharged from the machine by means of a conveyer T and the good grain is discharged from the machine by means of a conveyer U.

As different classes of stock may be treated in this machine it is necessary that the troughs A be adjusted to the proper position so that the cleaning of the stock can be carried on continuously and in the step described, and to gain the best results, the drum Y will be operated to rotate the hopper A to a limited extent, so that the angle of incidence of the stock with the drum D is varied to permit of an effective separation of the good and wild grain taking place.

All the hoppers A on each side of the machine as illustrated, in Fig. 2, are adjusted simultaneously, and as the operation of all the drums is simultaneously, then the cleaning of the stock can be carried on step by step with the result that a most effective cleaning of the stock is obtained.

I claim:

1. An apparatus of the class described, comprising a shaft supporting brackets provided with bosses in which said shaft is journaled, a roller, a hopper superimposed on the roller and formed with a segmental cylindrical cover having a slot therethrough, side members formed integrally with the cylindrical cover and forming side walls of the hopper and provided with radial slots adapted to engage the said bosses, and means for adjusting the hopper relative to the roller.

2. A machine for cleaning grain comprising a plurality of rollers, hoppers arranged above each of the rollers, each hopper being provided with a slot, and means for simultaneously adjusting all the hoppers circumferentially relatively to their adjacent roller, as and for the purpose specified.

3. A machine of the class described, comprising a series of double rollers, the rollers of each series being arranged one above the other, a hopper arranged above each roller, means for simultaneously adjusting all the hoppers relative to their adjacent rollers, troughs for receiving wild grain from the rollers, and troughs for receiving the good grain from the rollers.

MAURICE EVELYN GODDARD.

Witnesses:
JOHN E. WALSH,
ALLAN BENNETT.